Dec. 26, 1933.  R. M. SHARAF  1,940,820
MEANS AND METHOD OF DISPLAYING RUGS
Filed Aug. 22, 1929  8 Sheets-Sheet 1

INVENTOR
Ralph M. Sharaf
By
Ezekiel Wolf
ATTORNEY

Dec. 26, 1933.      R. M. SHARAF      1,940,820
MEANS AND METHOD OF DISPLAYING RUGS
Filed Aug. 22, 1929      8 Sheets-Sheet 2

FIG 2

INVENTOR
Ralph M Sharaf
By
Ezekiel Wolf
ATTORNEY

Dec. 26, 1933.                R. M. SHARAF                1,940,820
                    MEANS AND METHOD OF DISPLAYING RUGS
                    Filed Aug. 22, 1929         8 Sheets-Sheet 3

FIG 3

INVENTOR
Ralph M. Sharaf
BY
Ezekiel Wolf
        ATTORNEY

Dec. 26, 1933.    R. M. SHARAF    1,940,820
MEANS AND METHOD OF DISPLAYING RUGS
Filed Aug. 22, 1929    8 Sheets-Sheet 4

INVENTOR
Ralph M. Sharaf
By
Ezekiel Wolf
ATTORNEY

Dec. 26, 1933.                R. M. SHARAF                1,940,820
              MEANS AND METHOD OF DISPLAYING RUGS
             Filed Aug. 22, 1929        8 Sheets-Sheet 5

INVENTOR
Ralph M. Sharaf
By
Ezekiel Wolf
ATTORNEY

INVENTOR
RALPH M. SHARAF
BY
ATTORNEY

Patented Dec. 26, 1933

1,940,820

UNITED STATES PATENT OFFICE 1,940,820

MEANS AND METHOD OF DISPLAYING RUGS

Ralph M. Sharaf, Boston, Mass., assignor, by mesne assignments, to Ezekiel Wolf, Boston, Mass.

Application August 22, 1929. Serial No. 387,759

20 Claims. (Cl. 40—36)

The present invention relates to a method and means for exhibiting rugs or other similar articles.

The method of exhibiting rugs commonly employed in department stores or in stores specializing in the sale of such goods, is to have the rugs spread out in piles one on the other, and, when it is desired to show the assortment one man or two men, one at each end, throw back the top rugs one at a time and in that way exhibit the rugs beneath.

Sometimes rugs are hung from a wall suspension on hinged horizontal arms which may be opened like leaves of a book.

These methods and the devices employed while useful in some particular, fail in efficiently and properly exhibiting the rug to the best advantage. Where the rugs are in piles and successive rugs are thrown back starting from the top, not only does it often take two extra men to throw the rugs back, but the rugs are not properly exhibited, for as more and more rugs are thrown back the ones lower down in the pile become more and more covered and cannot be completely seen. It is very frequent that a customer asks to see a rug well down in the pack, completely exposed, and in this case all the rugs above have to be taken off, put somewhere else and then have to be put back again. This not only takes time but also demands considerable labour.

While rugs hanging are more easily exhibited, this is not the natural way to see rugs. On account of this, rug dealers are often requested to take a rug down and show how it would look on the floor. Besides this, rugs are often heavy and to suspend them from one edge requires quite large brackets and clumsy devices as well as putting an unnecessary strain on the fibres of the material. It should also be remembered that it usually requires considerable labour to take the rugs down and put them up in these brackets.

In the method, and with the means employed in my invention, I am able to exhibit each rug completely and without any manual labour. The rugs are rolled up one after another, put away, and can be brought back and again exhibited automatically.

I preferably roll each rug and unroll it again on a platform beneath the pack of rugs. If a person desires to view the rugs again, they may be brought up from the platform beneath and unrolled automatically in view of the observer. As usually the rugs are all stacked in piles one on top the other with nothing between them and then a roll starts at one end, rolls up the top rug and unrolls it on the platform beneath.

The rugs are so arranged that each top rug is at the same height that the previous one was, and level even though there may be a double thickness at the edge due to a seam. Each rug when put back in place again is properly aligned with the others there, so that the pack or pile is properly in order.

The present invention allows the salesman to be absolutely free in his work of salesmanship. He merely starts the machine and lets each rug be shown properly as it would if lying on the floor. When the pile has all been shown, he may if he likes reverse the order by pressing a lever and the rugs are again exhibited in the reverse order of their showing before.

These and the many other features of the present invention will be learned from a consideration of the description of the embodiment illustrated below in the drawings, in which;

Figure 4:
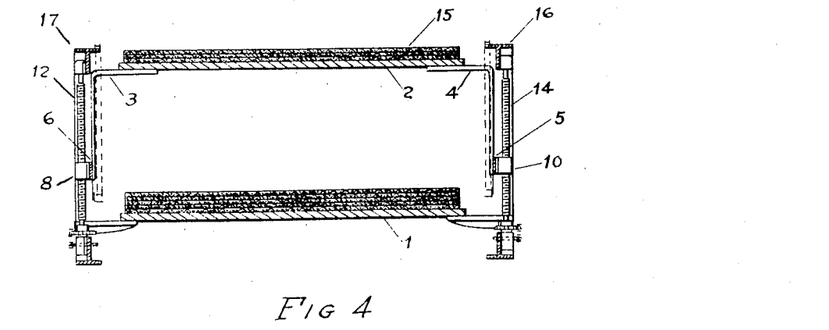
Figure 4 shows a section.
Figure 24:
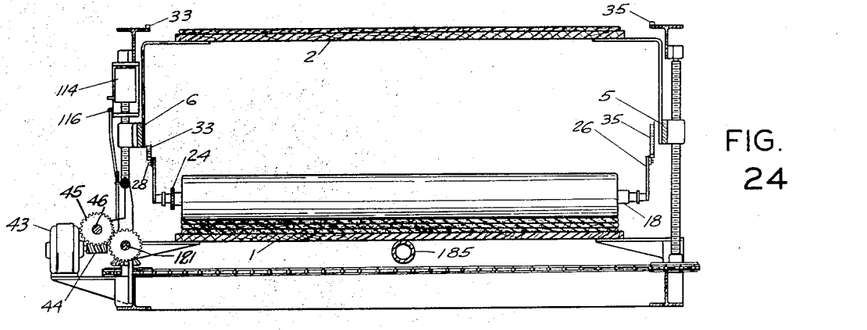
Figure 24 shows a section taken on Figure 3 looking to the end shown in Figure 23 about in the middle of Figure 3.
Figure 25:
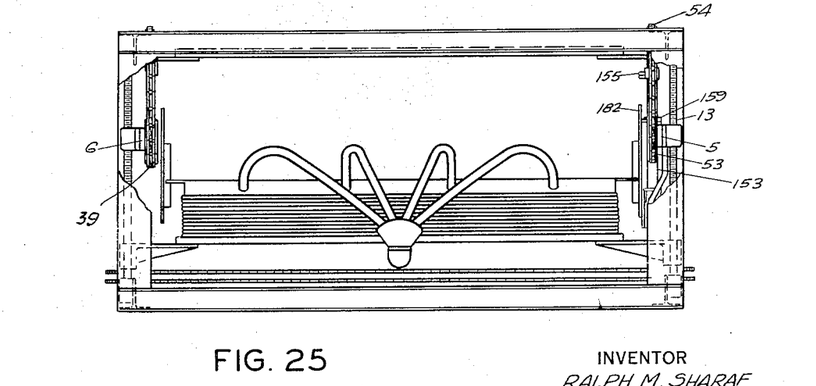
Figure 25 shows an end view of the end opposite from that shown in Figure 23.

In the invention, there is provided two platforms, 1, the lower platform which remains stationary during the operation of displaying one rug after another, and 2, the upper platform which is so arranged that the top rug displayed is always at the same height from the floor. These platforms in section may be seen in Figures 4 and 24.

The upper platform 2 is supported by the bracket 3, and 4 or by other suitable means to the plates 5 and 6 which have threaded collars, 7, 8, 9 and 10, fastened thereto through which collars work the screws 11, 12, 13 and 14. By this means the top table 2 may be raised and lowered and as will be shown later, it is raised and lowered automatically to keep the top rug 15 shown in Figure 4 exactly at the level of the side frame channels 16 and 17.

When a rug is taken from the top platform, the top platform rises the thickness of the rug to bring the top rug to the same level that the previous one occupied.

Figure 1:
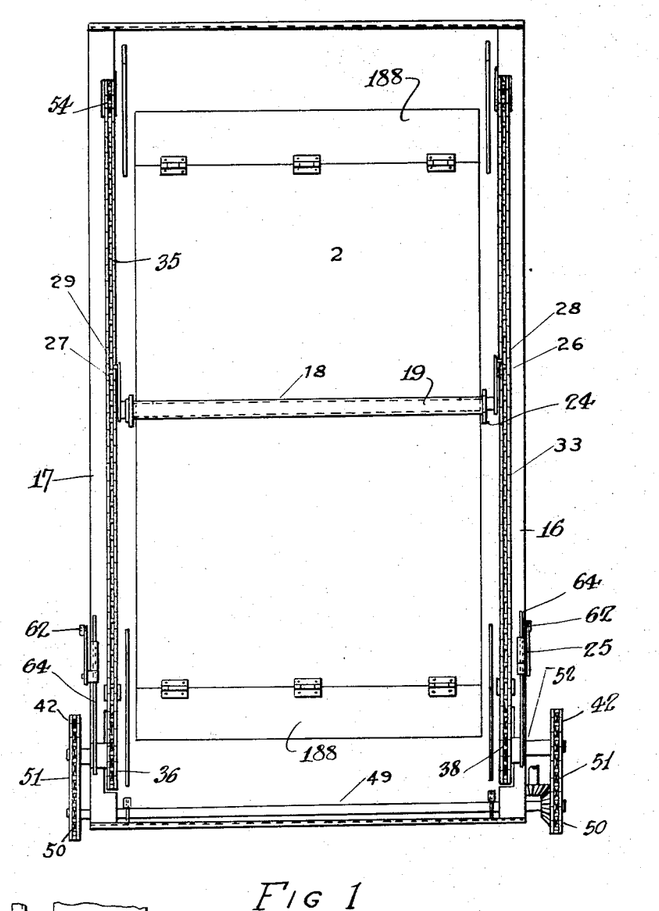
Figure 1 shows a plan view of the invention.
Figure 11:
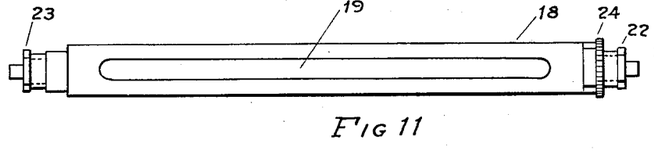
Figure 11 shows a detail of an element.
Figure 15:
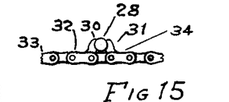

To remove the top rug, there is provided a roller 18 shown in Figure 11, which has a longitudinal slot 19 in which the end of the rug is automatically inserted as will be presently explained. This roller is also provided with two rods 20 and 21, which act as weights to keep the longitudinal slot 19 upmost in the particular position just before the edge of the rug is inserted in the slot as will be explained later. The roller is provided with square collars 22 and 23 and also a spur gear 24 which meshes in a rack 25 shown in Figure 6 to commence the rotation of the roller 18. As shown in Figure 1 at each end of the roller 18, are crank arms 26 and 27 in which the roller is free to rotate. These crank arms have pins 28 and 29 respectively which are held by jaws as shown in Figure 15 where the one piece 30 is joined to one link 32 of the chain 33 and the other piece 31 is joined to the next link 34 of the same chain. When the chain is straight as shown in Figure 15, the pin 28 is firmly held in the jaws, but when the links 32 and 34 are bent downward as shown in Figure 15 the pin 28 is free to move out. As shown in Figure 1, there is provided two chains 33 and 35, to which the pins 28 and 29 are held by means of the jaws as explained. The chains 33 and 35 are endless chains, and serve to carry the roller over the top table rolling up the rugs and over the bottom table unrolling the rugs, after which the roll is ready to commence the operation over again.

For this purpose, there are pivoted in bearings to the plates 5 and 6 which carry the top table tooth gears 37, 37, one near the one end of each plate and gears 39, 39 near the other end of each plate. To the stationary frame elements 40 and 41, there is pivoted in bearings the gears 36 and 38 which are run from the power supply. The power is supplied from the motor 43 driving a worm 44 which meshes with the gear 45 driving the shaft 46 and the bevel gear 47. The bevel gear 47 drives the bevel gear 48 which drives the shaft 49 having the tooth gear 50 attached thereto. This tooth gear or sprocket drives the chain 51 which drives the sprocket gear 42. These elements are duplicated on both sides of the machine as shown in Figure 1. The sprocket gear 42 on the right shown in Figure 1 drives the shaft 52 and the gear 38 shown in Figure 3 while the gear 42 at the left of Figure 1 drives the gear 36.

Figure 7:
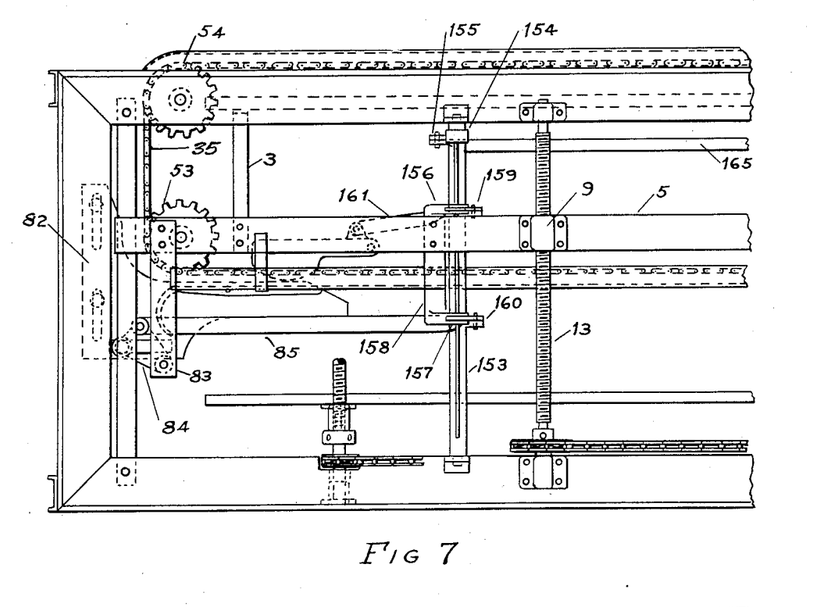
Figure 7 is a part side view showing some details.

The endless chain on the one side, the left passes over the gear 36 and 37 at one end of the machine and gear 53 and 54 as shown in Figure 7 at the other end of the machine.

As the power supplied keeps the chain 33 in motion, the roll 18 is put through its entire cycle. In Figure 1 there is shown only one roll but there is another on the platform beneath and there may be a third also, the one beneath doing the reverse operation from the one on top, so that there is no interruption in the operation.

Figure 20:
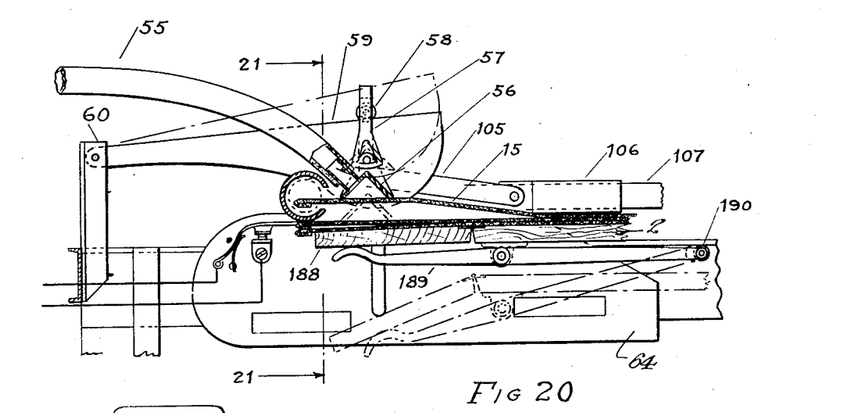
Figure 20 shows a detail.
Figures 21, 22:
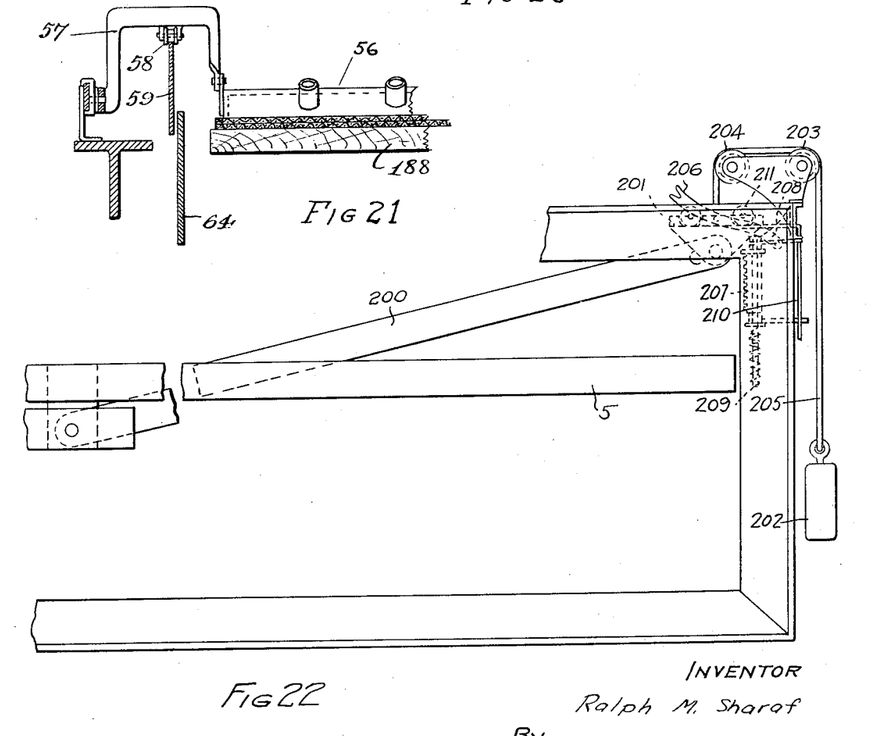
Figure 21 is a section on line 23—25 of Figure 20.
Figure 22 shows a further detail.
Figure 23:
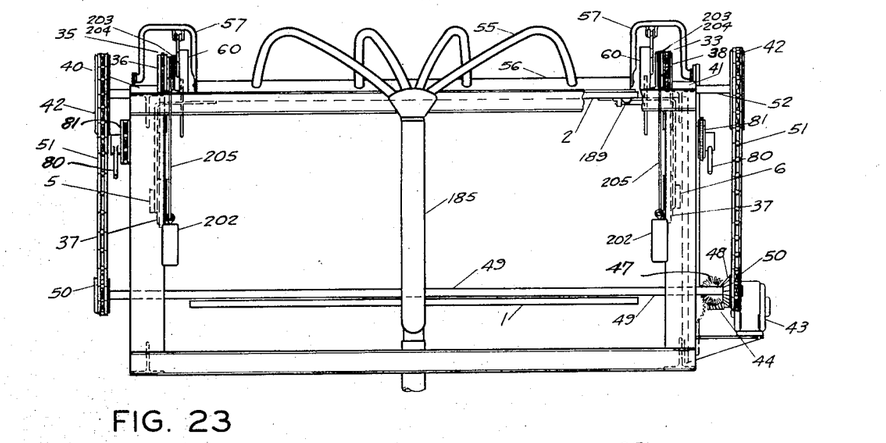
Figure 23 shows an end view looking from the end where the rugs are rolled on the top platform.

The rugs lie as shown in Figure 20, which is in part a longitudinal section through one end of the machine. In order to insert the end of the rug in the longitudinal opening in the roller 18, the rug is first raised. This is done by providing a suction source through the hose 55 and the nozzle 56, which extends the width of the rug and which provides means for gripping the rug without doing the latter any harm. As shown in Figure 21, the nozzle 56 is sectioned and suction is provided for each section so that if one section should be a little open, the other section will serve to hold the rug.

The nozzle 56 is carried by a frame 57, which is provided with a guide wheel 58 to keep the frame running on a plate 59. The plate 59 is pivoted to a bar 60 on the frame and further is gently curved in such a manner that as the roll 18 is brought against it as it moves to the right as shown in Figure 20, the plate itself is forced upwards and thereby the end of the rug to the position where it is just aligned with the opening in the roll 18.

Figures 5, 6:
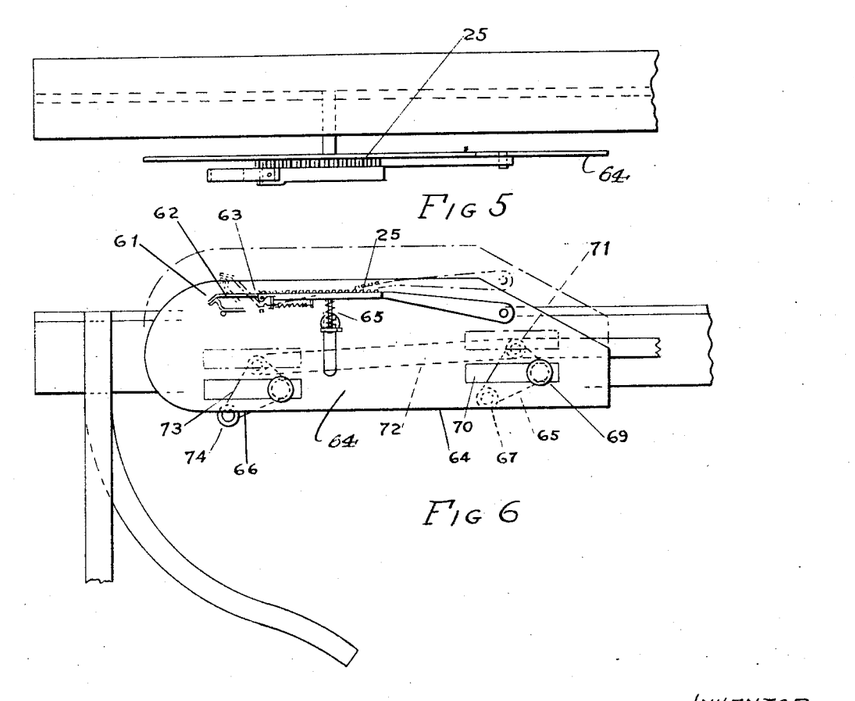
Figure 5 shows a detail.
Figure 6 shows a detail of the elements shown in Figure 5.
Figure 12:
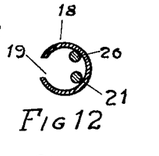
Figure 12 is a section of the element shown in Figure 11.
Figure 13:
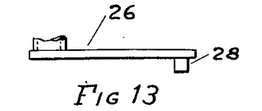
Figures 13, 14, 15, 16, and 17, show details.
Figure 14:
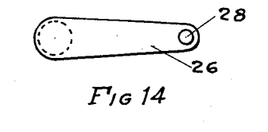

The roll 18 in being raised from the lower platform because of the rods 20 and 21 shown in Figure 12 has the opening 19 uppermost, and the square collar 22 in a definite position. As the roll comes up from the lower platform the collar 22 hits the guide spring 61, shown in Figure 6, which is then in its full line position. This turns the roll around so that the collar slides on the element 62 to the point 63 at which point the end of the rug has already entered the longitudinal slot 19 in the position shown in Figure 20. At this point the gear 24 of the roll 18 as shown in Figure 11 begins to mesh with the rack 25 and turn the roll clockwise in Figure 20, so that the end of the rug is turned downward and held as the roll starts to roll up the rug. The rack only extends a little distance as shown in Figure 6, as after one turn is made, the friction of the rolled rug on the rug beneath is sufficient to continue the rolling process since the roll is free on the crank arm 26.

The rack 25 is carried by the plate 64 and is held in a horizontal position by means of the spring 65. The horizontal position is the position for rolling up the rugs. When the rugs are to be unrolled the rack is put down out of the way of the gear on the roller by shifting the plate 64 to the dotted line position of Figure 6. The rack then assumes the dotted line position shown in the figure.

Figure 3:
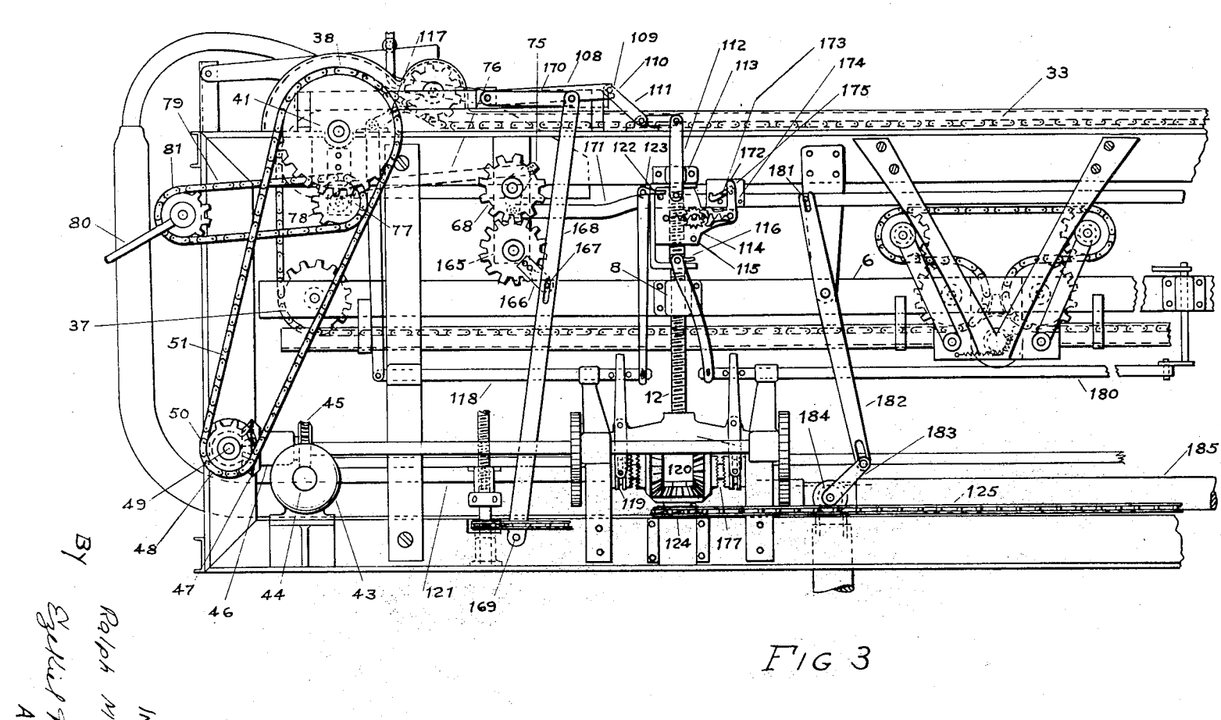
Figure 3 shows a part side view looking from the other side.

The raising and lowering of the plate 64 is effected by means of the triangular cams 65 and 66. The cam 65 is made integral with the shaft 67 pivoted to the frames and driven by the tooth gear 68 shown in Figure 3. The cam 65 carries a stud 69 working in a slot 70 in the plate 64 and a second pivot 71 to which is linked the bar 72 running to the second cam 73. The cam 66 is likewise pivoted in the frame by the pivot 74. When the gear 68 is turned counter clockwise as shown in Figure 3, the plate 64 is thrown upwards and backwards and the rack assumes a tilted position. This shifting is only necessary when it is desired to stop rolling rugs up and off at the top and reverse the process of bringing rugs up from the bottom.

The gear 68 shown in Figure 3 is operated by the crank arm 75 which is linked to the shaft 76 which in turn is driven by the gear 78 through the arm 77. The gear 78 is operated by the handle 80 and the gear 81 and chain 79. When the handle 80 is thrown downward in Figure 3, the gear 78 is rotated counter clockwise and likewise the gear 68 bringing the plate 64 up. The rest of the reversing mechanism will be explained later.

After the rug is rolled up at the top platform it is taken down to the platform below and unrolled there. The raising and lowering of the top platform so provides that the roller is in exact position to unroll as will be seen later. The roll coming from the top down, follows the guide plate 82 shown in Figure 7 which guide plate is carried by the plate 5 by means of the plate 83 attached to it, which in turn is attached to the plate 92 by the cam 84. As explained in connection with Figure 6, the cam 84 is the means for raising or lowering the guide plate when reversing operation. For this purpose the cam 84 is freely linked with the link 85 which is operated by the reversing mechanism as will be later described. The plate 82 being attached to the plate 5, it raises or is lowered when the plate 5 moves. When all the rugs are at the top platform, the plate 5 is at its lowest point which is the point to deposit the first rug on the platform below. It will be noted that the plate 82 therefore is in its proper position.

Figures 8, 10:
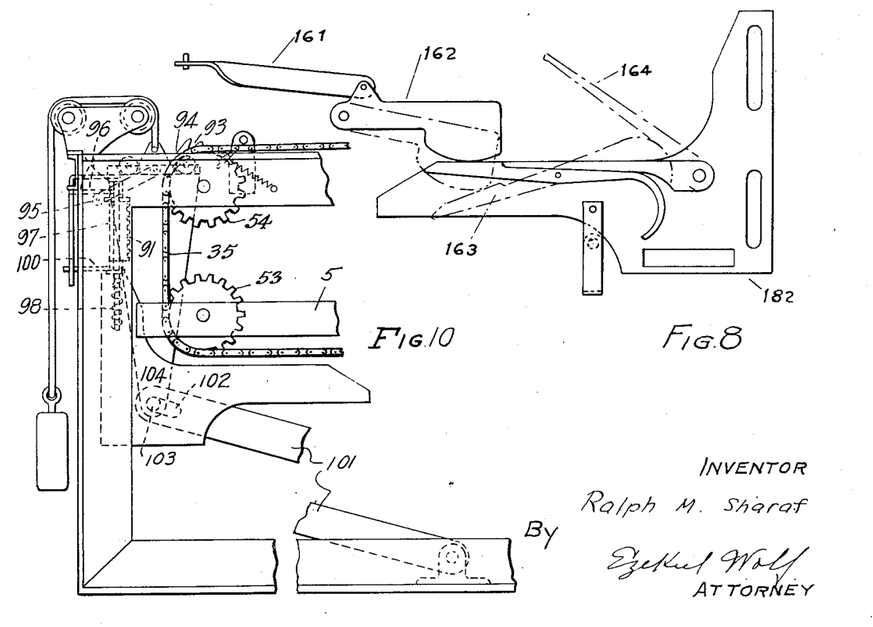
Figure 8 shows a detail.
Figure 10 shows a detail.
Figure 9:
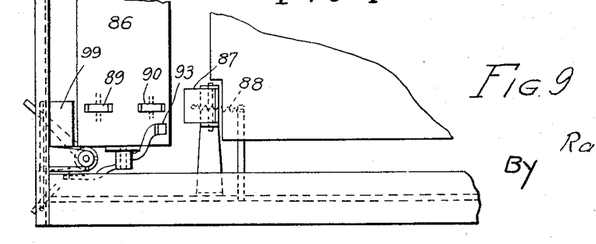
Figure 9 shows a detail.

The rug is held in proper position for unrolling at the lower platform by the mechanism shown in Figures 9 and 10. The roll with the rug rolled up comes along the platform 2 to the end. Due to a slight unevenness the edge may be at the lower end of the roll or somewhere on the side. The roll is guided on the platform 86 by means of the guide plate 87 backed by the spring 88. The rolled rug falls on the platform 86 between two rollers 89 and 90. The roller 89 is provided with a gear adapted and positioned to mesh with the rack 91 as the platform 86 descends. The platform 86 is balanced by a counter weight 92, so that after the rolled rug has left it, it may ascend again. When the rolled rug comes upon the platform 86, the position of the edge of the rug is not known. As the platform descends the roll 89 driven by the gear meshing with the rack 91 unwinds the rug until the edge strikes the open jaw 93 of the arm 94. This arm 94 is pivoted to the platform and when the jaw end is lowered a pin 95 in the opposite end raises a latch arm 96. The rack 91 is spring torsion tensioned on the shaft 97 by means of the spring 98, and when the latch is released the rack flies around 90° counter clockwise as shown in Figure 9 by the dotted position of the arm 99 attached to the rack. The platform ascending by the weight of the counter weight brings the arm 99 back into position. This is done by the inclined rod 100, on the lower side of which the arm 99 bears. When the arm 99 comes to the top it clears the rod 100, but not before the latch has dropped in place.

This mechanism brings the edge of the rug to a definite position and when the endless chain starts pulling the roll over the lower platform, it begins unrolling in the proper position.

To guide the platform in its motion, there is provided a bar 101 which has a slot, 102, in which a pin 103 attached to the plate 104 of the platform works. The bar 101 is shown in Figure 10 pivoted to the frame, but it may be pivoted to the plate 5.

It has been stated above that the rugs on top are maintained at the same level at all times. By this is meant the same level with the floor on which the machine rests. The mechanism which accomplishes this will now be described.

To the suction nozzle is attached an arm 105, which is pivoted in a slide 106, sliding on the stationary beam 107. This is shown in Figure 20. This arm 105 also carries attached thereto an arm 108 shown in Figure 3, which arm has a forked end 109. The forked end engages a pin 110, carried by the pivoted lever 111, which is pivoted to an ear attached to the stationary frame. The other end of the lever carries a rod or bar 112, which works in the stationary bracket 113. The bar 112 carries the piece 114 shown in Figure 16. When a rug is first picked up at the end shown in Figure 20, the suction element 56 drops the thickness of the rug with the result that the arm 108 in Figure 3 is raised and the bar 112 dropped a corresponding distance. This action drops the piece 114 the measured thickness of the rug.

When the roller picking up the rug has passed over the arm 117 shown in Figure 3, this action forces the bar 118 to the left shown in Figure 3 and causes the clutch 119 to mesh with the differential 120. This applies the power driven shaft 121 to the differential and rotates the screw 12 in Figure 3 counter clockwise, sending upwards the piece 114. The piece 114 is provided with a pin 122 which on its upward motion strikes the lever 123 which action moves the rod 118 to the right throwing the differential out of gear with the power. The screw 12 then ceases to rotate.

It should be noted that the screw 12 is provided with a sprocket 124 and a chain 125 which is endless and meshes with similar sprockets on screws 10, 11, and 13. When the screw has stopped moving, the bars 5 and 6 have been raised the thickness of a rug and therefore the upper platform has been raised as well. The rug beneath the one rolled up is now at the same level as the previous one.

As the upper platform is lowered the endless chain passing over the sprockets 38, 37, 53 and 54, must be lengthened, since the lower sprockets 53 and 37 are pivoted on the plates 5 and 6, and lower with the lowering of the platform. To accomplish this, there are pivoted on the plates 5 and 6 sprocket gears 126, and on the arms 127 pivoted to the plates 128, also carried by the plates 5 and 6, there are carried the gears 129 and 130. The discs 131 and 132 bear against the curved bars 133 and 134 and as the bar 7 is lowered, the gears 129 and 130 are drawn together, thus lengthening the chain. The bars 134 and 133 are so curved that as the table is lowered the same tension on the chain is preserved.

Figure 2:
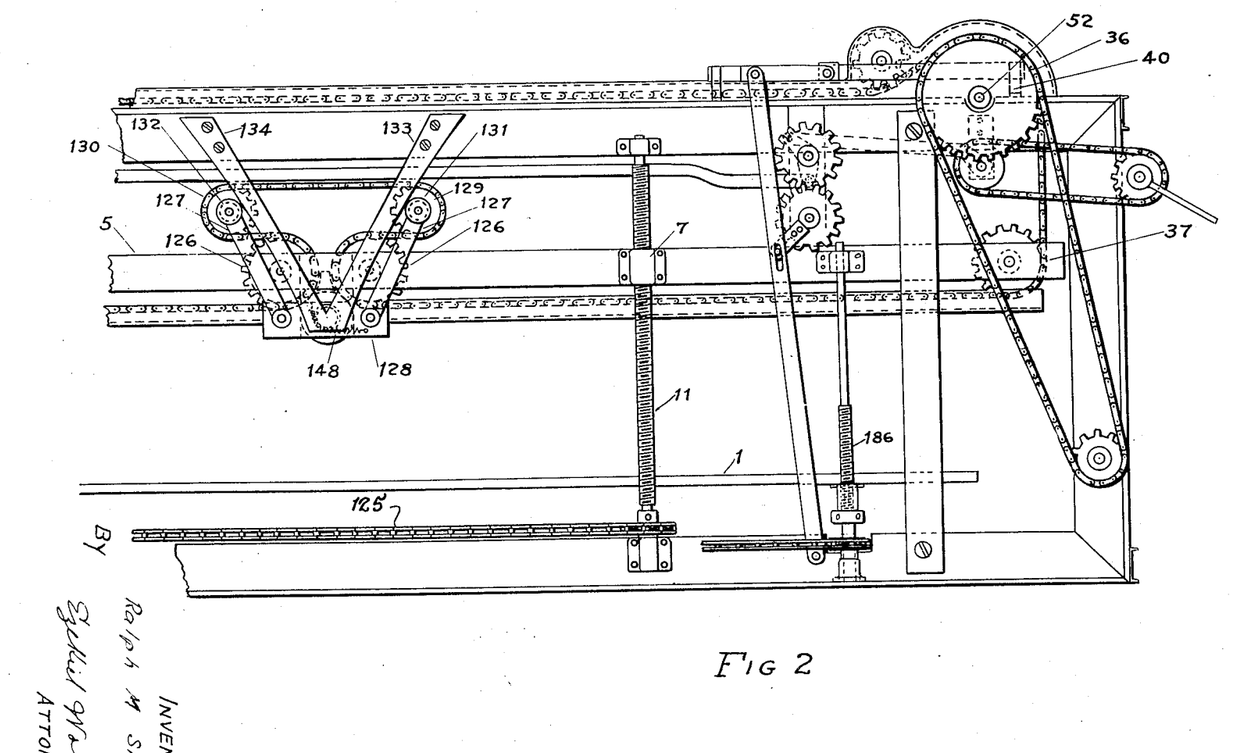
Figure 2 shows a part side view looking from one side.
Figure 19:
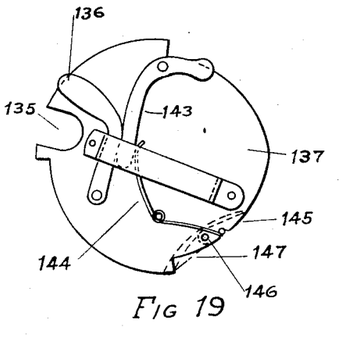
Figure 19 is a detail of an element shown in Figure 17.

Since the roller 18 is carried and held by the endless chain 33 which passes over the gears 126, 129, 130 and 126, the whole roll would have to be carried over the same gears, which would be impractical. There is provided therefore a mechanism at the side as shown in Figures 2 and 3, and more particularly in Figures 17, 18 and 19, which disconnects the roller from the jaws 30 and 31, and again pick the roller up when the jaws have passed over the gears for taking up the slack in the chain.

Figure 17:
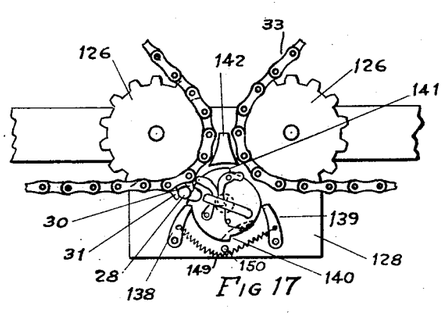

Figure 17 shows the pin 28 about to be dropped by the jaws 30 and 31.

The left gear 126, rotating counter clockwise brings the jaws 30 and 31 around with it. At the point shown in Figure 17, the pin 28 enters the cavity 135, but the jaw 30 bearing against the arm 136 continues to rotate the cam 137 until the pawl 138 comes in the shoulder 140. In this same position, the shoulder 141 comes into the pawl 139, so that the cam 137 is locked both ways. The pin 128 with the roller is then in the middle of the guide 142 and the cam 137 is about symmetrical with the vertical.

By this time the pin 28 is entirely free from the jaws 30 and 31 which are carried around on the chain 33 over the upper sprocket gears.

The jaws after passing about the upper sprocket gears return around the right gear 126. The jaw 30 first strikes against the finger 136 and this in turn pushes the inside end of the lever 143 which is pivoted to the cam and which raises the pawl 139 allowing the cam 137 to be carried and rotated by the jaws 30 and 31, bringing the pin 28 in the cavity 135 exactly in line between the jaws.

When the cam 137 has been rotated about 180 degrees as shown in Figure 17, the pin 28 drops out or is grasped by the jaws 30 and 31, and the roller is therefore again picked up by the jaws.

In order that the cam 137 may be returned back to its initial position, the pressing of the arm 136 works the spring 144 and flaps over the member 145 pivoted at 146 to fill out the cam edge, as shown by the dotted line position 147. This allows the pawl 138 to ride over the shoulder 140. The energy for the return of the cam 137 is provided by a spring 148 shown in Figure 2. When, therefore the jaws pass beyond the lever 136, and release the cam, the spring 148 returns the cam back to normal. The pawls 138 and 139 are tensioned by a spring 149 about a pin 150, so that the pawls always ride against the edge of the cam 137.

Figures 16, 18:
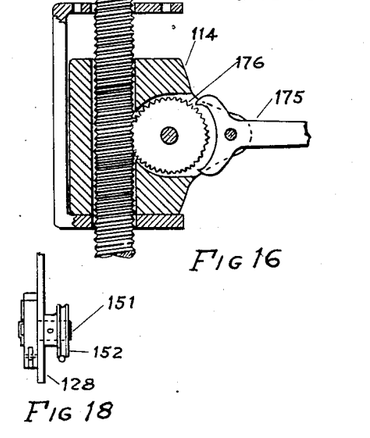
Figure 18 is a side view of Figure 17.

The cam 137 is pivoted in the plate 128 by means of the shaft 151 which has a thumb nut 152 to keep it in position. This is shown in Figure 18.

The operation of rolling the rugs up at the top platform, and unrolling it beneath has been explained. When the rugs have all been exhibited the upper table is at its top point and all the rugs are down on the lower platform.

It is then desired to shift the operation and roll the rugs up at the bottom and unroll them at the top.

The same mechanism for beginning the winding of the rug, aligning the edge of the rug and roller, and rolling up is repeated. Since the upper rug at the bottom platform is definitely located by the position of the bar 5, the plate 64 corresponding to the lower level is mounted on the bar 5, as shown in Figure 7. As on the top platform a suction member is provided at the power platform, which is raised out of use when the rugs are being unrolled on the bottom, and put in use when the rugs on the bottom are being rolled up and deposited on top.

This mechanism is shown in Figures 7 and 8. In Figure 7 there is shown a bar 153 pivoted at the top and bottom in the frame. This bar carries a collar 154 which has a crank 155 attached to it and by which the bar 153 can be rotated. To the bar 153 there is also attached the freely sliding collars 156 and 157, carried on the same piece 158 and having the arms 159 and 160. The arm 159 operates the arm 161 which is linked with the arm 162 pivoted to the bar 5. As shown in Figure 5, the arm 162 bears upon the lever 163 pivoted on the plate 82, and raises the finger 164 which carries the suction arrangement.

When the arm 161 is pushed to the right in Figure 8 by operation of the rod 165, shown in Figure 7, the finger 164 is raised carrying out of the way the suction element, and this allows the rugs to be rolled out on the table below. When the arm is pushed to the left, the finger 164 is lowered, and the suction rest on the top rug and is operated as described and shown in connection with Figure 20.

When one operation has been completed and it is desired to employ the reverse operation, the operator throws down the handle 80, shown in Figure 3.

Part of the operation of this mechanism has already been explained, namely the shifting of the plate 64 as shown in Figure 6, and the raising and lowering of the finger 164 of Figure 8.

Besides this, however, the shaft 76 rotating the gear 68, rotates in the reverse direction, the gear, 165. This gear carries an arm 166 which has a pin 167 working in the bar 168 pivoted at the bottom of the frame at 169. The free end of the rod 168 has linked to it a bar 170, which is attached to the slide 106 carrying the suction arrangement. When the bar or arm 168 is pulled backwards, as when the gear 165 rotates clockwise, the slide 106 is carried back and so the suction device.

At the same time the bar or rod 171 is urged to the right in Figure 3. This bar carries a plate 172, which has two pins, 173 and 174, between which is the bell crank lever 175. The bell crank lever 175 is shown enlarged in Figure 16. It is pivoted to the element 114 and has a pawl engaging the gear 176. A toggle spring is provided and the movement of the bar 171 to the right in Figure 3, makes the lower claw of the pawl engage the gear 176 while the movement of the pawl to the left makes the upper claw of the pawl engage the gear.

With the upper claw of the pawl engaging, the gear 176 can rotate counter clockwise and the member 114 can drop but cannot be raised unless the screw 12 is rotated. This is the mechanism by which the table is raised each time a rug is taken off.

When the bar 171 shifts the lever 175, so that the lower claw is holding the member 114 will not drop but must be carried down by the action of the screws 12. The screw 12 in this case is operated by the power source through the differential 120 when the clutch 177 is thrown in. The roller 18 striking the arm 178 rotates it and thereby forces the arm 179 in the opposite direction. The arm 179 is linked with the rod 180 which is moved to the right in Figure 3, throwing the clutch 177 in gear. This rotates the screw 12, and carries the element 114 downward until the pin 115 hits the lever 116 which action pulls the rod 180 to the left restoring the arm 178 in its initial position. The element 114 is raised from its lower position by the action of the lever 111 and the bar 112. When the rug is rolled out on the top platform, the bar 112 is temporarily raised that much, thus bringing the piece 114, until the table is lowered the thickness of the rug.

The shifting mechanism also controls the suction valve. The rod 171 carries a pin 181 in which works the forked end of the pivoted lever 102 which at its free end is linked with the arm 103 of the suction valve 184. In one position the suction is supplied to the upper suction element and cut off from the opposite lower. When rugs are being brought up, the suction is cut off from the upper and supplied to the lower through the pipe 185.

While the lower table is stationary during the operation, it may be adjustable for the number of rugs used. This is shown in Figure 2 and comprises a screw drive 186, a threaded collar 187 which carries the table 1. By rotating the screw 186 the lower table may be raised or lowered.

It has been stated above that in spite of the fact that the edge of the rug may be thicker the rugs on top lie flat. This is shown in Figure 20. The top platform has a hinged flap 188. Beneath this flap is a lever 189, pivoted to the floor as shown about one third the length and held at the opposite end to the frame at 190. As the table drops down when more rugs are piled, the lever 189 assumes the dotted line position of Figure 20, thus dropping the flap 188 to keep the rugs level.

In Figure 22 is shown the mechanism for raising the roller with the rug rolled thereon to the top platform. For this purpose a bar 200 is pivoted to the bar 5 on the inner side and on its free end to the table 201 which works in a slot in the bar 200. The table 201 has a counterweight 202 supported over pulleys 203 and 204 by the line 205. The other mechanism is similar to that shown in connection with Figure 10 and comprises the lever 206 for fixing the position of the unrolling of the rugs in a manner similar to that described in connection with Figure 10 by means of the rack 207, the latch 208, the spring 209 and the bar 210. The bar 210 is placed in such a fashion to bring back the rack so that it may engage the gear 211 when the table is being raised.

The roller coming to the end of the bar 5, brings the bar 200 down and with it the table 201 until the roller comes upon the table when the counterweight 202 helps raise the table with the rugs on it. The table stays at the top until the next roller begins to pull the table down.

This means not only locates the position of the edge of the rug, but aids in raising the rug which may be a considerable weight.

Having now described my invention, I claim:—

1. A device for displaying rugs, spread out in piles, comprising means including a roller for rolling up the top rug of the pile, means for unrolling the rug thus rolled on the position of a second pile, and means for bringing the roller in position to roll the rug occupying the top position of the first pile.

2. A device for displaying rugs comprising two platforms on which the rugs may be placed, means for rolling up the rugs on either platform and means for transferring the rug thus rolled to the other platform.

3. A device for displaying rugs comprising two parallel platforms positioned one above the other on which the rugs may be placed, means for rolling the rugs up on one platform and unrolling them on the other platform and means for maintaining one of the platforms at the same level regardless of the number of rugs thereon.

4. A device for displaying rugs comprising two parallel platforms positioned one above the other on which the rugs may be placed, means for rolling the rugs up on one platform and unrolling them on the other platform and means for maintaining the upper platform at the same level regardless of the number of rugs thereon.

5. In a device for displaying rugs, two platforms positioned one above the other, an endless chain, a plurality of gears about which said chain passes, some of said gears fixed relative to said upper platform, means for lowering said upper platform the thickness of the rug placed thereon, and means for maintaining the same tension on the chain regardless of the motion of the upper platform.

6. In a device for displaying rugs, two platforms positioned one above the other on which the rugs may be placed, means for raising or lowering the upper of said platforms and means for measuring the thickness of the rugs transferred for controlling the operation of said raising or lowering means.

7. A device for displaying rugs including two platforms positioned one above the other on which the rugs may be placed and means for rolling the rugs on the platforms including a roller having a slot therein, a square collar provided at the end of the roller, a gear also provided near the end of the roller, a flat strip positioned at the side of the platform on which said roller slides and a rack also positioned at the side of the platform to provide a rotation of the roller after the rug has been engaged by the same.

8. A device for displaying rugs including means for rolling up the top rug of a pile comprising a roller having a slot therein, a crank arm attached to either end of said roller, a pin provided at the end of said crank arm and means engaging said pin for moving said roller.

9. A device for displaying rugs including means for rolling up the top rug of a pile comprising a roller having a slot therein, a crank arm attached to either end of said roller, a pin provided at the end of said crank arm, a link chain and jaws provided thereon for grasping said pin and means for moving said chain and thereby said roller.

10. A device for displaying rugs including means for rolling up the top rug of a pile comprising a roller, a crank arm attached to either end of said roller, a pin provided at the end of said crank arm, a link chain and jaws provided thereon for grasping said pin, means for taking up the slack in said chain as the height of the pile changes and means for disengaging said pin while said jaws are passing over said means comprising means for receiving said pin at one point in the movement of said jaws, means for positioning said pin to a second point reached by the jaws when said jaws have passed over said means for taking up the slack where said pin may be grasped by said jaws.

11. In a device for displaying rugs lying in a pile and having a roller attached to an endless chain for rolling the rugs, means for taking up the slack in said chain as the height of the pile changes and means for disengaging said roller from said chain during part of its motion including a cam having a recess therein and two shoulders on opposite sides of said recess substantially 90° apart, a plurality of elements engaging said shoulders and means for releasing said elements to allow movement of said cams.

12. In a device for displaying rugs, a table adapted to have rugs thereon, means for successively rolling up said rugs on said table and means for lowering or raising said table an amount sufficient to keep said rugs at the same height at all times.

13. In a device for displaying rugs, a table adapted to have rugs thereon, means for successively transferring the rugs by rolling to or from the table, said table having an end-hinged flap and means for lowering said table and dropping said flap an amount sufficient to keep the rugs on an even level when said rugs are transferred.

14. In a device for displaying rugs, a table adapted to hold a pile of rugs thereon, means for successively transferring the rugs to or from the table including means for grasping the rug preparatory to rolling it up and means for aligning the edge of the rug with the grasping means.

15. In a device for displaying rugs, an upper and a lower platform upon which the rugs are spread in piles, means for rolling the rugs up on either platform, a table at each end of said platforms adapted to receive the rug rolled up on said platform, means for raising or lowering said table and means provided on said table for positioning the rolled rugs to have their edges aligned on said platform.

16. In a device for displaying rugs, a platform on which the rugs are spread in piles, means for rolling the rugs up and removing them from said platform and means for raising or lowering said platform including a plurality of screws for supporting said table, a source of power, a clutch for engaging the source with said screw and means for operating said clutch, said means controlled by the level of the rugs.

17. In a device for displaying rugs, a platform on which the rugs are spread in piles, means for rolling the rugs up and removing them from said platform and means for raising or lowering said platform including a plurality of screws for supporting said table, a source of power, a clutch for engaging the source with said screw and means for operating said clutch including a member riding on said screw and means for locking said member from dropping down, said operating means controlled by the level of the rugs.

18. In a device for displaying rugs, a platform on which the rugs are spread in piles, means for rolling the rugs up and removing them from said platform, and means for raising or lowering said platform including a screw, a source of power, and means for operating said screw either to raise or lower the platform, said latter means including a member riding on said screw, a gear pivoted in said member to engage said screw and a pawl adjustable to permit said member from being moved only in one direction on said screw when the latter is not in motion.

19. A device for displaying rugs, comprising two aligned parallel platforms on which said rugs are spread, means for rolling up the top rug on either platform, means for transferring the rolled rug for either platfom to the other and means for maintaining the rug on the top platform at substantially the same level at all times.

20. In a device for displaying rugs, a frame, two platforms, supported by said frame, the top platform adapted to hold a pile of rugs, and means for maintaining the top rug on the upper platform, always in the same position with respect to said frame.

RALPH M. SHARAF.